United States Patent [19]

Schap

[11] Patent Number: 5,063,710
[45] Date of Patent: Nov. 12, 1991

[54] POWER DRIVE FOR SLIDING DOOR
[75] Inventor: William W. Schap, Muskegon, Mich.
[73] Assignee: ITT Corporation, New York, N.Y.
[21] Appl. No.: 587,295
[22] Filed: Sep. 24, 1990
[51] Int. Cl.[5] .......................................... E05F 15/00
[52] U.S. Cl. ...................................... 49/280; 49/139; 49/362
[58] Field of Search ............... 49/280, 139, 140, 362, 49/360, 214, 215

[56] References Cited
U.S. PATENT DOCUMENTS

| 4,152,872 | 5/1979 | Tanizaki et al. | 49/215 X |
| 4,462,185 | 7/1984 | Shibuki et al. | 49/280 X |
| 4,617,757 | 10/1986 | Kagiyama et al. | 49/360 X |
| 4,640,050 | 2/1987 | Yamagishi et al. | 49/280 |
| 4,644,692 | 2/1987 | Schindehutte | 49/360 X |
| 4,852,422 | 8/1989 | Mori | 49/362 X |

Primary Examiner—Philip C. Kannan
Attorney, Agent, or Firm—Robert P. Seitter; J. Gordon Lewis

[57] ABSTRACT

A power drive for a sliding door includes a slider for guided sliding movement along a fixed path between first and second end limits of movement. The slider operably engages with a sliding door to impart motion from the slider to the sliding door when traveling in a first direction. A reversible power drive is provided for driving the slider along the fixed path between the first and second end limits of movement in first and second directions of travel. A latch release, coupling the slider to the sliding door, initially releases a latch mechanism and, after release of the latch mechanism, transfers motion from the slider to the sliding door when traveling in the second direction.

14 Claims, 5 Drawing Sheets

POWER DRIVE FOR SLIDING DOOR

BACKGROUND OF THE INVENTION

The present invention is directed to a power drive for a sliding door and is particularly adapted for driving sliding doors employed on automotive van type vehicles.

Manually operable sliding doors have been utilized for many years on vans to provide a relatively large door opening at one side of the vehicle affording convenient access to the cargo 10 or rear passenger compartment of the van. Because this sliding door is universally located on that side of the vehicle remote from the drivers seat, and thus requires the driver to leave his seat to open or close the door, power drive systems operable by controls accessible from the drivers seat have been developed and are disclosed in the prior art. See, for example, U.S. Pat. Nos. to Shibuki et al., 4,462,185 and Schindehutte 4,644,692.

In the development of a power drive system for a sliding door employed on an automotive vehicle, certain factors peculiar to this particular application must be considered. First, the door is mechanically latched in its closed position by well known latch mechanisms and must be manually released by manually operable door handles located at the inner and outer sides of the door. Thus, powered opening of the door from its latched closed position necessarily requires a manual release of the latch before the door can move from its closed position. The latch releasing door handles are out of reach from the drivers seat.

Second, in many situations, it is more convenient to operate the door manually, and it is essential that the door be capable of being manually operated without interference from the power drive in the event of a malfunction or failure of the power drive system. Thus, the power drive system should provide the capability of accommodating a shifting from power to manual operation or vice versa with the door in any position on its path of travel.

Third, when the door is in its fully closed position, the outer surface of the door is flush with the outer surface of the vehicle body. The door is mounted upon the vehicle body for sliding movement by rollers carried by the door which are received in roller tracks fixedly mounted on the vehicle body. During initial movement of the door away from its closed position, the door must move outwardly away from the longitudinal centerline of the vehicle until the inner side of the door clears the outer side of the vehicle body. The door is then moved rearwardly past the outer side of the vehicle body along a path parallel to the vehicle centerline. This path is determined by the configuration of the tracks which support the door carried rollers and these tracks extend from their rearward ends forwardly parallel to the vehicle centerline and are then curved inwardly toward the centerline at their forward ends, these inwardly curved portions of the tracks establishing the inboard and outboard components of movement of the door to and from its closed position within the recessed door opening. A resilient door seal extending around the periphery of the door opening must be compressed by the door during the final phase of its movement to its fully closed position, this compressive force being applied in a direction normal to the vehicle centerline. Where the power drive arrangement is such that the powered force supplied to the door acts in a direction parallel to the vehicle centerline, the inboard inclination of the door carrying tracks referred to above reduces the effective force applied to the door at a time when the maximum application of force is required to compress the door seal. One approach to this problem is disclosed in the Schindehutte Patent 4,644,692 referred to above.

Another factor which must be considered is that the length of the path of movement of the door between its closed and open position is fairly substantial and the drive mechanism must include at least one component movable with the door over the entire length of the path of movement of the door. Exposure of moving parts of the drive should be minimized, and space within cavities or shielded recesses within the vehicle body for protectively enclosing components of the drive system is extremely restricted.

Finally, because in the usual case a power drive system for the sliding door will be marketed as a buyers' option, the system should be so designed that its installation requires no substantial alterations to a standard manually operable sliding door.

The present invention is directed to a power drive system for a sliding door which incorporates latch release mechanism automatically operable upon powered opening of the door from its closed position, a drive mechanism which accommodates unrestricted shifting between manual and powered operation at any door position and maintains direct alignment between the direction of positive drive powered force applied and the direction of movement of the door throughout the full range of door movement, which requires a minimum exposure of components of the drive system, and which may be assembled to operate a standard manually operable sliding door without requiring any substantial modification of the standard door or vehicle body.

SUMMARY OF THE INVENTION

A power drive system in accordance with the present invention includes an elongate guide track having a central passage extending through its entire length and a lengthwise slot extending from the central passage outwardly through a wall of the guide track, the slot likewise extending the entire length of the track. A slider is formed with a main body portion slidably received within the central passage in the track and a web portion which projects from the body portion through the slot in the track to support a coupling portion at the exterior of the guide track. The guide track is fixedly mounted on the vehicle body to extend along the lower edge of the door opening with the central passage and slot in the guide track extending parallel to the path of movement of the door.

An elongate flexible push/pull cable projects into the forward end of the central passage of the guide track and has its rearward end fixedly secured to the forward end of the body portion of the slider. The push/pull cable projects forwardly from the forward end of the guide track to pass through the nip between a gear and an idler mounted for rotation about parallel axes within a gear box which may be mounted on the vehicle floor beneath the passenger seat of the vehicle. A wire like member is helically wound about the exterior of the push/pull cable and the teeth of the gear in the gear box are held by the idler meshed between adjacent turns of this wire to provide a positive drive coupling between the wire and gear. The gear is coupled to a reversible electric motor by a centrifugal clutch. The centrifugal clutch is normally disengaged when the motor is not running so that manual movement of the door with the power drive deenergized can move the push/pull cable longitudinally with the unclutched drive gear in mesh with the cable rotating freely. Rotation of the drive motor upon energization engages the centrifugal clutch to couple the motor to the drive gear. Rotation of the motor will drive the drive gear in rotation which in turn will drive the push/pull cable in longitudinal movement to drive the slider in sliding movement along the guide track.

The door is mounted on the vehicle body by a standard arrangement which includes a horizontal web fixedly secured to and projecting inwardly from the door at its lower front corner and carrying rollers supported in a track fixedly mounted on the vehicle frame, this track establishing the path of movement of the door. The roller carrying web on the door projects laterally across the path of movement of the web portion of the slider at the forward side of the slider. Thus, if the push/pull cable is pulled forwardly by the power drive, the web portion of the slider will engage the horizontal web on the door to pull the door forwardly with the slider. During manual operation of the door, manually induced rearward movement of the door will cause the horizontal web on the door to push the slider rearwardly along with the door.

A flexible Bowden wire including an elongate flexible sheath and an elongate wire slidably received within and projecting from the opposite ends of the sheath is mounted on the door with one end of the sheath fixedly mounted upon the horizontal roller carrying web on the door. One end of the wire extends from this last end of the sheath and projects rearwardly through a bore in the coupling portion of the slider. An enlarged portion fixed to this end of the wire rearwardly of the slider prevents the wire from being withdrawn forwardly through the bore.

The opposite end of the wire is coupled to a movable latch actuating member mounted within the door. The opposite end of the Bowden wire sheath is fixedly mounted to the door adjacent this member. The length of the wire is such that with the door latched in its closed position, the enlargement at the end of the wire which projects through the bore and the slider abuts the rearward end of the slider and the latch release member is spring biased to apply a slight tension to the wire.

Powered opening of the door is accomplished by energizing the drive motor to push the push/pull cable rearwardly in its guide track. The consequent rearward movement of the slider moves its web rearwardly away from the horizontal web on the door and, by pushing rearwardly on the enlargement on the wire of the Bowden wire applies tension to the wire. This tension in turn shifts the latch release member to which the wire is coupled in a latch releasing direction to release the door latch. Once the door latch is released, the door is free to move rearwardly from its closed position and is pulled rearwardly by rearward movement of the slider transmitted to the door via the wire to the latch mechanism which is mounted on the door.

Other objects and features of the invention will become apparent by reference to the following specification and to the drawings.

IN THE DRAWINGS

Figure 1:
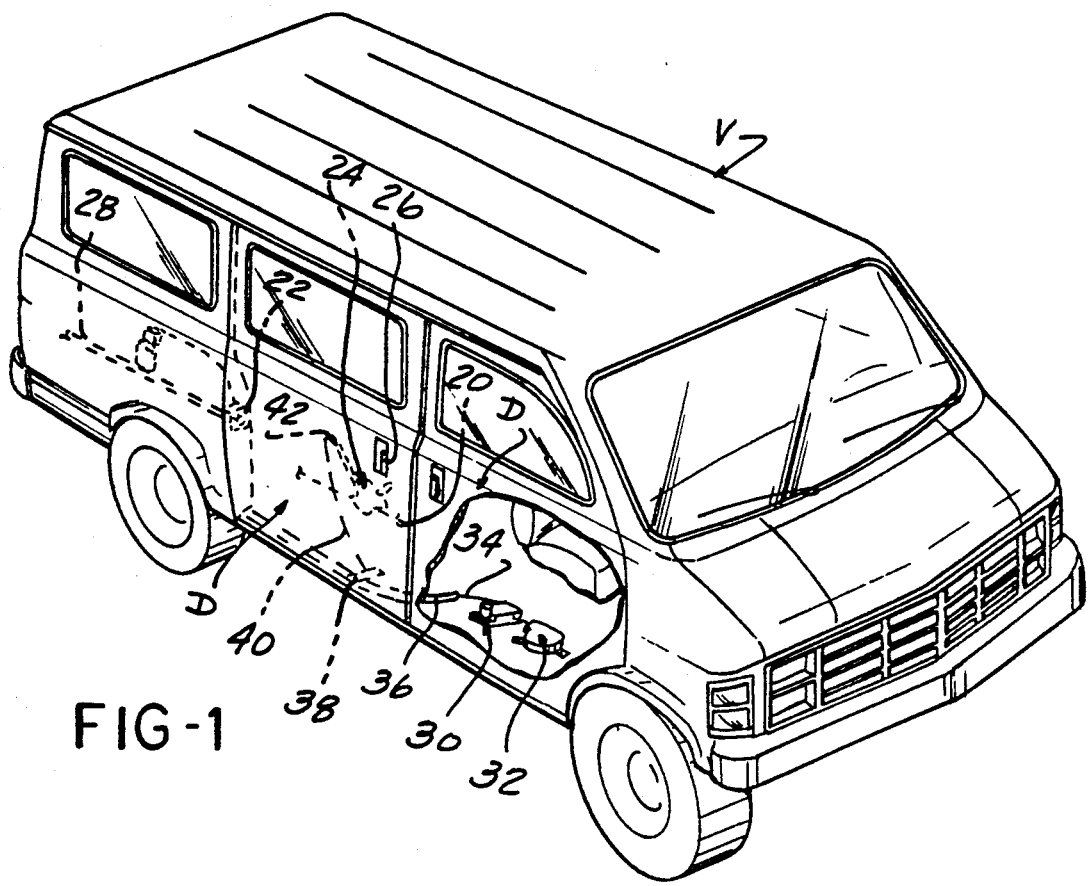
FIG. 1 is a perspective view, with certain parts broken away or indicated in broken line, of a typical van having a sliding door to which the present invention is applied.

Referring first to FIG. 1, a typical van V is provided with a sliding door designated generally D located immediately rearwardly of the passenger side front door P of the van. The door D is of the same construction as a standard manually operable sliding door and typically is provided with front and rear latches 20, 22 mounted on the door D to be latched to strikers, not shown in FIG. 1, fixedly mounted on the vehicle frame at the front and rear edges of the door opening. Within the interior of the door D, a latch release mechanism designated generally 24 is mounted and is coupled to interior and exterior door handles to unlatch latches 20 and 22 upon manual actuation of the door handle, such as the door handle 26.

The door D is mounted on the vehicle frame for movement to and from the closed position shown in FIG. 1 in which the outer side surface of the door D is flush with the outer side surface of the vehicle body. To move the door from its closed position to its open position, the door initially moves outwardly away from the vehicle centerline until its inner side surfaces are clear of the outer side of the vehicle body. After this clearance has been established, the door is then moved horizontally rearwardly along the side of the vehicle until its front edge clears the rear edge of the door opening. The door D is supported for movement along this path by an arrangement which is completely conventional, and has thus not been illustrated. Typically, three web like brackets are fixedly mounted upon the door to project inwardly from the door, one of these brackets being located adjacent the front lower corner of the door, a second bracket being located adjacent the upper front corner of the door and the third bracket being located adjacent the rearward edge of the door approximately midway of the height of the door. Each of these brackets carries one or more rollers at its inner end. The rollers are received within tracks fixedly mounted in the vehicle body. From their rearward ends, each of these tracks extends horizontally parallel to the vehicle centerline to a point short of the forward end of the track. The forward end of the track is inclined inwardly toward the vehicle centerline to establish the inward and outward displacement of the door toward or away from the vehicle centerline during the final phase of its movement to its closed position or the initial phase of its movement away from the closed position. The rollers carried respectively at the upper and lower front corners of the door ride in tracks which extend respectively along and adjacent to the upper and lower edges of the door opening, the rollers carried at the rearward edge of the door are mounted on a bracket which projects inwardly through a slot 28 in the outer side of the vehicle to a track, not shown, located in the interior of the vehicle side panel. Such arrangements are conventional in the art and are well known, see, for example, Tanizaki et al., 4,152,872. One of the attributes of the present invention is that it is well adapted to be installed to operate such a conventional door without requiring any substantial modification to the door. Although the power drive system of the present invention is most conveniently installed during assembly of the vehicle, it is so designed as to be well adapted to after market installation.

In FIG. 1, the power drive of the present invention includes a reversible electric motor and gear box designated generally 30 and a push/pull cable storage housing 32 which may be conveniently mounted on the vehicle floor beneath the front passenger seat. A push/pull cable 34 extends from storage housing 32 through gear box 30 and into the front end of a guide track 36. Certain components of the drive system, to be described in greater detail below, are mounted upon the conventional door mounting bracket described above which is located adjacent the front lower corner of the door and indicated at 38 in FIG. 1. A Bowden wire 40 of the power drive system of the present invention extends from the door mounting bracket 38 to a lever 42 pivotally mounted within the door to cooperate with the conventional latch actuating mechanism 24 of the door.

Figure 2:
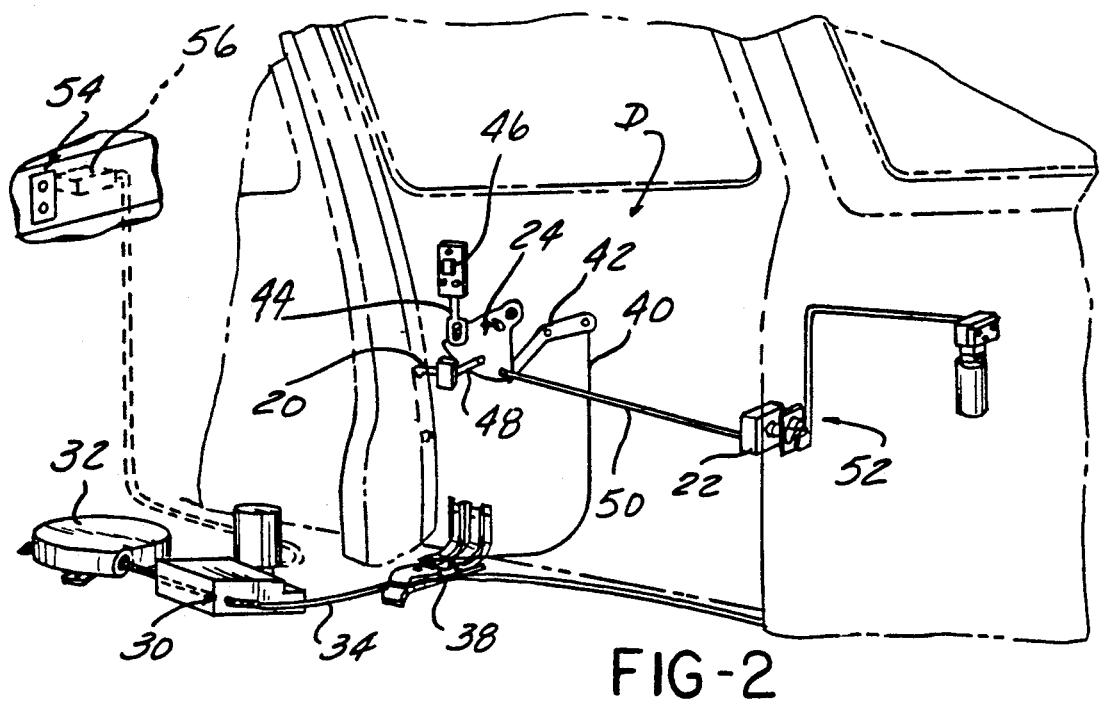
FIG. 2 is a perspective view of a portion of the interior of the van with certain parts broken away or omitted.

In FIG. 2, a view of the system from the interior of the van shows a link connection 44 between latch actuating mechanism 24 and the interior door operating handle 46 and the link interconnections 48, 50 between the latch actuating mechanism 24 and the front 20 and rear 22 latches. Due to the substantial force required to compress the door seal upon closing of the door, the striker pin which cooperates with the rear door carried latch 22 may take the form of a powered striker mechanism designated generally 52.

Additional elements of the power drive system shown in FIG. 2 which are not shown in FIG. 1 are a switch assembly 54 for actuating the reversible electric motor which powers the drive in either a door opening or door closing direction, the switch assembly 54 being located on the vehicle dash or some other location easily accessible from the drivers seat of the vehicle. The drive system may also include an electronic control unit 56 for stopping the door at opposite ends of its stroke, for providing an overload release disengaging the drive in the event an object is caught between the closing door and door frame, etc.

Figure 3:
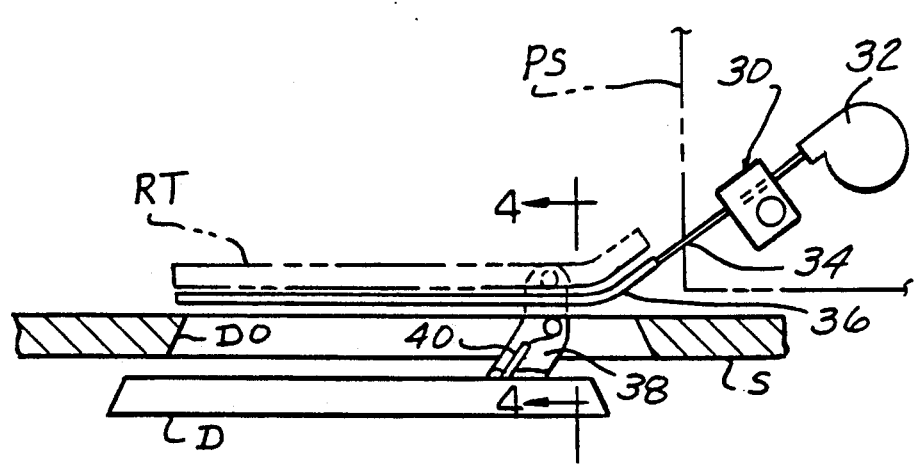
FIG. 3 is a simplified top plan view of a schematic nature showing the interrelationship of various components of the present invention.

FIG. 3 is a schematic view showing in top plan the relationship of various components of the power drive mechanism to the door D and door opening DO with the door shown in a partially open position. The conventional roller carrier bracket 38 of the door (see also FIG. 4) projects inwardly from the door D below guide track 36 of the power drive system into operative relationship with the conventional roller track RT which receives rollers carried at the inner end of bracket 38 to support and guide the door in movement. Guide track 36 of the power drive system extends parallel to the roller track RT and is inclined inwardly toward the vehicle centerline at its forward end. The drive 30 and cable storage housing 32 are, as described above, mounted on the vehicle floor beneath the passenger seat whose outline is partially indicated in broken line in FIG. 3 at PS.

Figure 4:
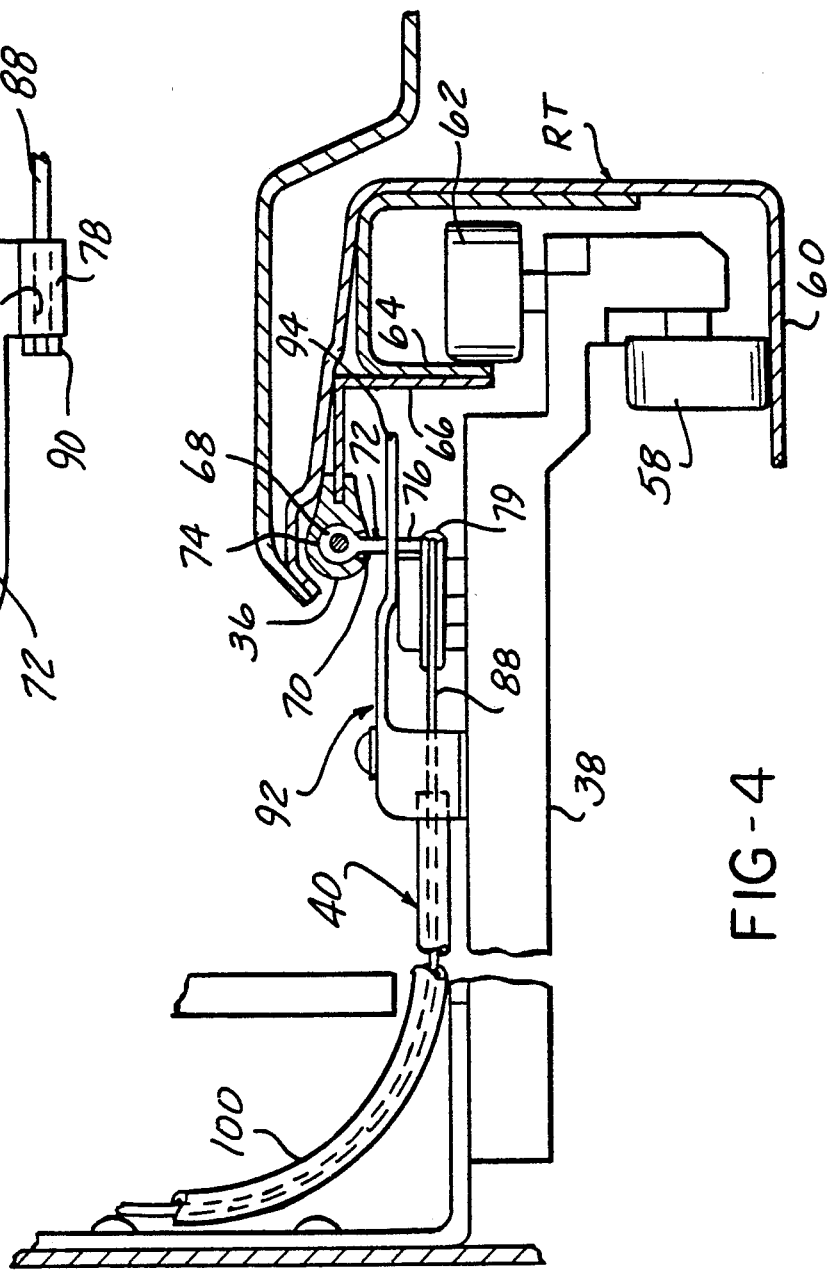
FIG. 4 is a detailed cross sectional view taken on a vertical plane normal to the centerline of the van showing a portion of the sliding door drive.

Referring now to FIG. 4, it is seen that mounting bracket 38 carries at its inner end a first roller 58 mounted for rotation about a horizontal axis to roll upon a horizontal support portion 60 of roller track RT. A second roller 62 is mounted upon bracket 38 to roll within a guide slot portion 64 of roller track RT. The guide track 36 of the power drive system may conveniently be mounted upon roller track RT as by a continuous angle bracket 66 to assure accurate alignment and parallelism of guide track 36 with roller track RT.

A central passage 68 of circular cross sectional configuration extends the entire length of guide track 36. A slot 70, which likewise extends the entire length of guide track 36 extends downwardly from the central passage 68 through the wall of track 36. A slider designated generally 72 is formed with a cylindrical enlargement 74 at its upper end which is slidably received within central passage 68 and is integrally joined to a downwardly extending vertical web 76 which projects freely through slot 70 to a second cylindrical enlargement 78 integrally joined to the lower end of web 76.

Figure 5:
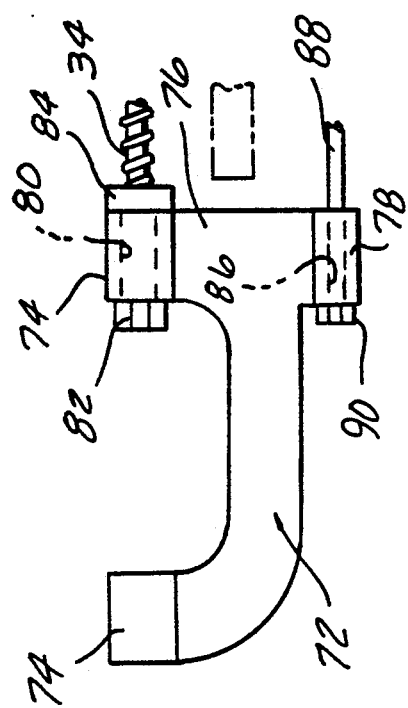
FIG. 5 is a detailed side elevational view of a slider employed in the drive of the present invention.

Referring to FIG. 5, slider 72 is preferably formed with a recess in its upper edge to minimize binding while providing sufficient length to stabilize the slider. Cable 34 extends through a bore 80 in the slider and is locked against longitudinal movement relative to the slider as by abutments 82 and 84 fixed to cable 34 and abutting the slider at opposite ends of bore 80. Cable 34 is slidably received within central passage 68 of guide track 36.

The lower cylindrical enlargement 78 on slider 72 is likewise formed with a through bore 86 which receives a wire 88 which constitutes a component of the Bowden wire 40 described above in connection with the description of FIG. 2, (see also FIG. 4).

Wire 88 is freely slidable through bore 86 but is formed with an enlarged abutment 90 at its rearward end, (left hand end as viewed in FIG. 5) which prevents withdrawal of wire 88 forwardly through bore 86.

As will be described in greater detail below, operation of the power drive motor — gear box 30 will drive push/pull cable 34 in forward or rearward movement through guide track 36 and, because slider 72 is fixedly attached to cable 34, the slider will likewise be power driven in sliding movement along guide track 36. The mechanism by which this power driven movement of slider 72 is transmitted to the door is best understood by reference to FIGS. 4 and 6-9 of the drawings.

Figure 7:
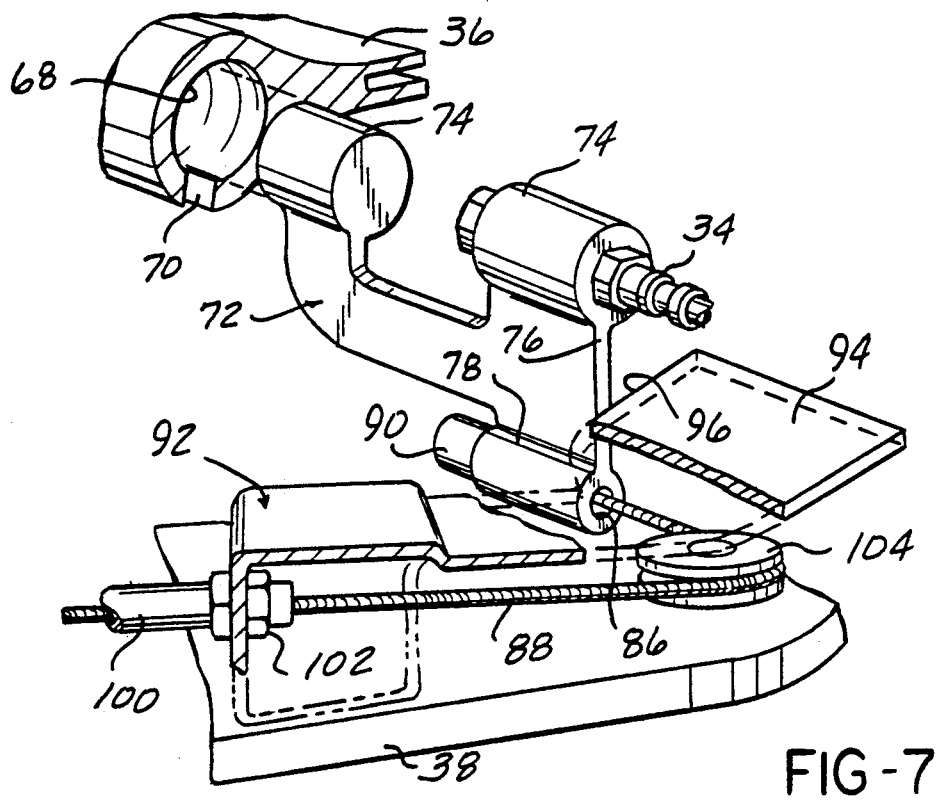
FIG. 7 is a perspective view of a portion of the sliding door drive showing the relationship of the slider to other components of the drive, with certain parts broken away or shown in section.
Figure 6:
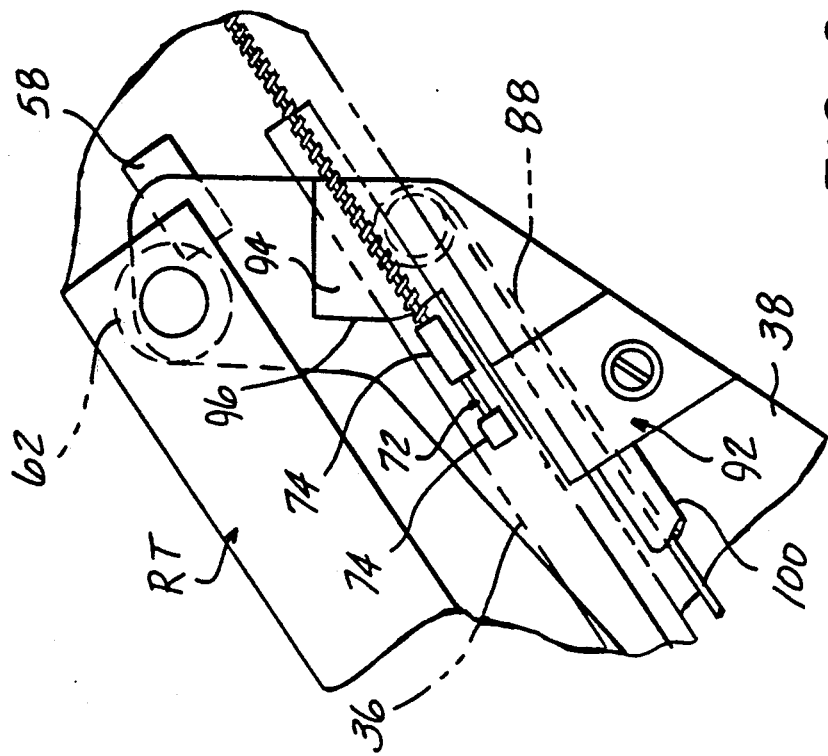
FIG. 6 is a detailed top plan view showing a portion of the elements shown in FIG. 4, with certain parts broken away or shown in broken lines.

Referring first particularly to FIGS. 4, 6 and 7, a rigid, partially open housing 92 is fixedly mounted upon the top surface of the roller carrying bracket 38 which is in turn fixedly mounted on the lower front corner of the door. Housing 92 is formed with an integral horizontal web portion 94 which is spaced above the upper surface of the roller carrying bracket 38 and projects, as best seen in FIGS. 4 and 7 horizontally across the path of movement of the web portion 76 of slider 72 at the forward side of the slider. From FIG. 7, it is believed apparent that upon forward power driven movement of slider 72 (movement to the right as viewed in FIG. 7), the forward edge of web portion 76 of the slider will engage the rearward edge portion 96 of web portion 94 of the housing 92 and this forward movement of slider 72 will be transmitted by housing 92 to bracket 38 and thence to the door which is fixedly attached to bracket 38. This abutment between the web portion 76 of the slider and the web portion 94 of the housing 92 fixed to bracket 38 is employed to drive the door forwardly toward its closed position.

Opening movement of the door is a somewhat more complex operation because the door is latched in its closed position, and the latch must be released before the door can move away from its closed position. The drive of the present case transmits rearward movement of the slider in the door opening direction to the door via the latch actuating mechanism in a manner such that initial motion of the slider in the door opening direction is transmitted by wire 88 and lever 42 to the latch mechanism 24 to release the door latches and subsequent movement of the slider in the opening direction is transmitted to the door either by the engagement of the latch release mechanism with a stop fixed to the door which establishes the latch release position of the latch mechanism or through the conventional spring which biases the latch mechanism to its latch closed position and thus acts in opposition to the slider applied force urging the latch mechanism to its latch open position.

Bowden wire assembly 40 is constituted by a flexible outer sheath 100 within which wire 88 is slidably received. As best seen in FIG. 7, one end of the outer sheath 100 is fixedly secured to and projects into housing 92 as at 102 Wire 88 projects beyond this end of the sheath and is trained about a direction changing idler pulley 104 rotatably mounted on bracket 38 with wire 88 extending from pulley 104 into and rearwardly through bore 86 in the lower cylindrical enlargement 78 of slider 72 with enlargement 90 fixed to wire 88 in abutment with the rear side of enlargement 78.

Figure 8:
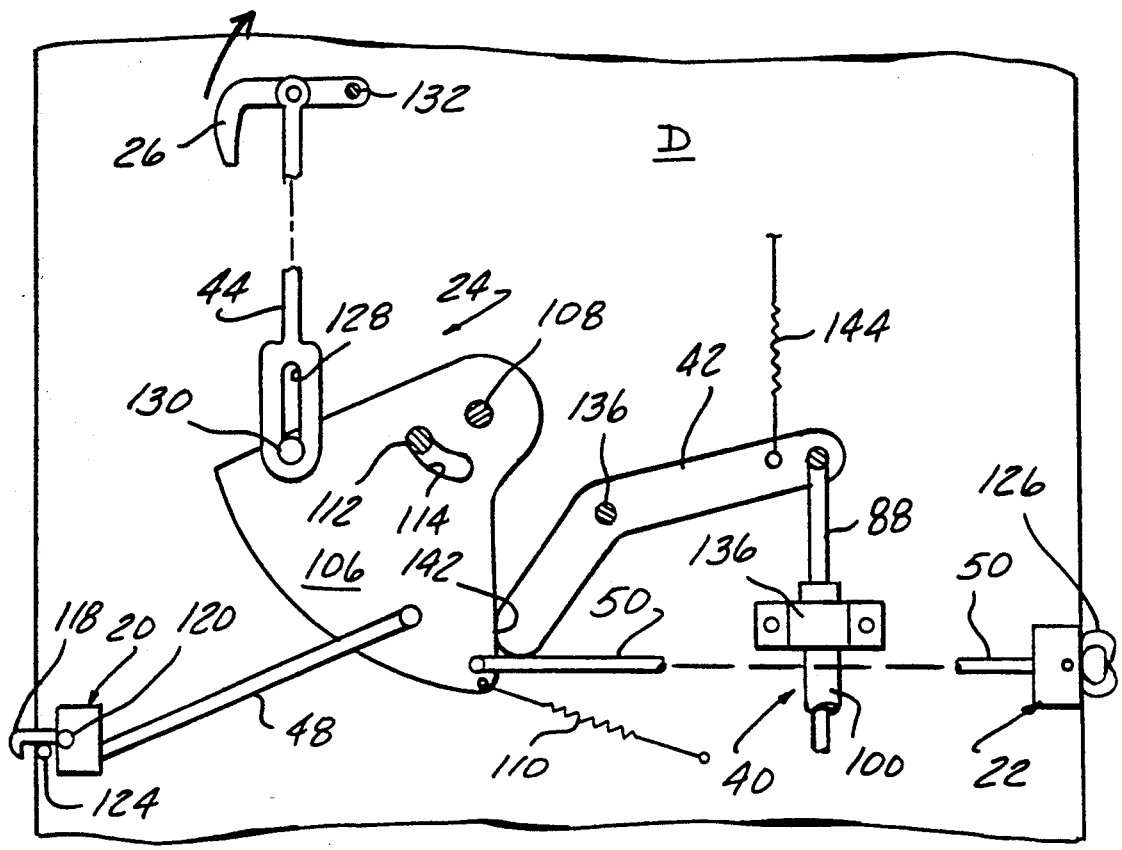
FIG. 8 is a schematic diagram showing a portion of the drive of the present invention and its relationship to a conventional sliding door latch release mechanism.
Figure 9:
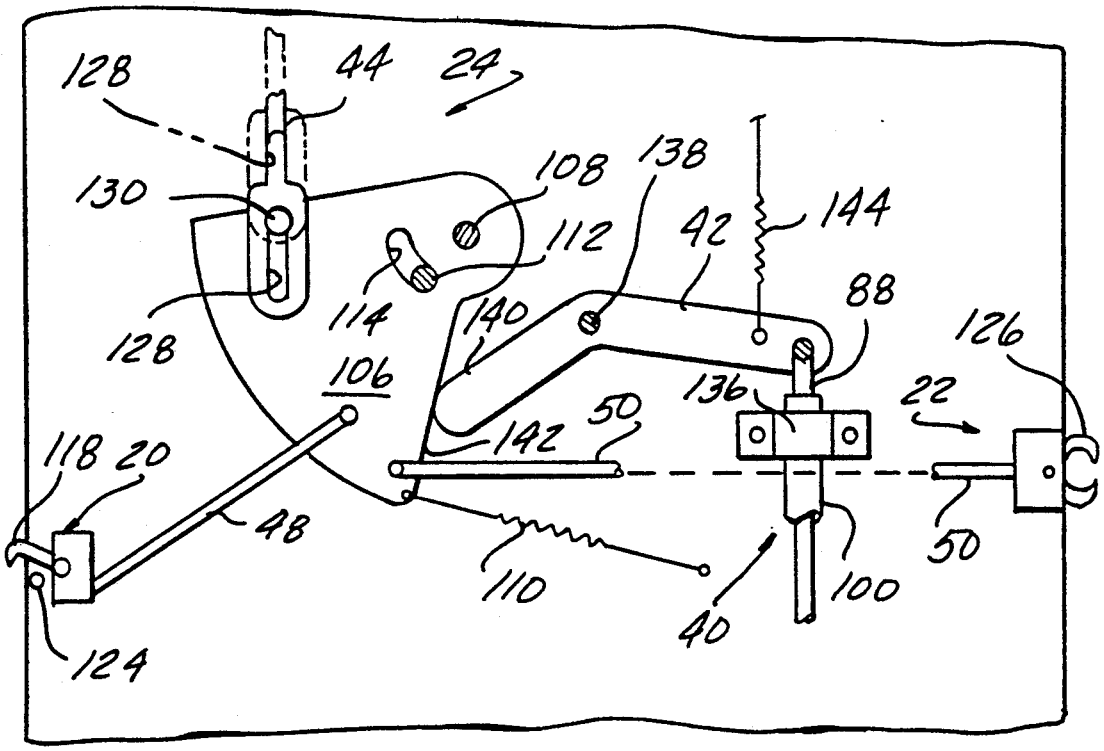
FIG. 9 is a schematic diagram similar to FIG. 8, showing the latch mechanism in a latch release position.

Referring now to the schematic illustrations of the latch release mechanism 24 shown in FIGS. 8 and 9, conventional elements of mechanism 24 include a latch actuator member 106 mounted for pivotal movement about a pivot pin 108 fixedly mounted upon the door frame. In FIG. 8, actuating member 106 is shown in its normally assumed latch closed position to which it is resiliently biased as by a spring 110. A suitable stop arrangement, such as a stop pin 112 fixed to the frame of door D and projecting into an arcuate slot 114 through actuating member 106 may establish, with spring 110, the normal rest position of actuator member 106. As previously described, actuator member 106 is coupled to the front latch mechanism 20 by a rod like link 48 pivotally connected at one end to actuator member 106 and operatively coupled at its opposite end to mechanism 20 to control a latch pawl 118 mounted for pivotal movement in mechanism 20. A second rod like link 50 is pivotally coupled at one end to latch actuator 106 and has at its opposite end operatively received within a conventional clasp type latch mechanism 22 at the rearward edge of the door, the orientation of mechanism 22 being altered from its actual orientation for purposes of explanation The clasping elements 126 of latch 22 are in their latch closed position in FIG. 8.

Manual opening of the front and rear latches 20 and 22 is accomplished by a link 44 formed with an elongate slot in its lower end into which projects a pin 130 fixed to actuator member 106. Door handle 26 is mounted for pivotal movement about a fixed pivot 132 on door D, and upward movement of the handle 26 about pivot 132 will lift link 44 to pull actuating member 106 in clockwise movement about its pivot 108 to shift actuator member 106 to the position indicated in FIG. 9. This rotative movement of actuator member 106 pushes link 48 to shift latch member 118 to its latch release position, and pulls on link 50 to open the clasp members 126 of the rear latch assembly as indicated in FIG. 9. A pin 112 may establish the end limit of pivotal movement of actuator member 106 in a clockwise direction.

The structure schematically indicated in FIGS. 8 and 9 which has been described thus far is conventional.

Components of the power drive system of the present invention which are schematically indicated in FIGS. 8 and 9 include the Bowden wire 40 and the lever 42. Referring briefly to FIG. 7, one end of the sheath 100 of Bowden wire 40 is fixedly mounted in housing 92 and one end of wire 88 projects from this last end of the sheath 100 to pass around pulley 104 to be slidably received within bore 86 of slider 72. Returning now to FIGS. 8 and 9, the opposite end of sheath 100 of the Bowden wire is fixedly mounted to the door frame as by a clamp bracket 136, and wire 88 projects from this end of the sheath to have its end pivotally coupled to one end of lever 42.

Lever 42 is mounted upon the frame of door D for pivotal movement about a fixed pivot pin 138. The end 140 of lever 42 remote from the end to which wire 88 is connected can abut an abutment surface 142 on actuating member 106, and biasing spring 144 connected between the door D and lever 42 biases end 140 of lever 42 in a direction maintaining wire 88 in tension.

Returning now to FIG. 7, as explained above, an enlargement 90 fixed to the end of wire 88 prevents withdrawal of wire 88 forwardly (to the right as viewed in FIG. 7) from bore 86. The length of wire 88 between abutment 90 at one end of the wire and the point of pivotal connection between the opposite end of the wire and lever 42 is such that when the door D is latched in its closed position, with lever 42 in the position shown in FIG. 8, abutment 90 (FIG. 7) will be biased into contact with the slider at the rearward (left hand end) of bore 86 by the tension applied to the wire by the spring biased lever 42. Upon actuation of the power drive system to drive the door from its latched closed position to its open position, push/pull cable 34 is driven by the drive to drive slider 72 to the left as viewed in FIG. 7. The engagement of the slider with abutment 90 increases the tension in wire 88 as the slider begins to move rearwardly to the left as viewed in FIG. 7 and, referring to FIG. 8, the slider induced tensioning of wire 88 will overcome the bias of spring 144 and pull upon the end of lever 42 to pivot lever 42 in a clockwise direction as viewed in FIG. 8 about pivot pin 138. This clockwise movement of lever 42 causes end 140 of lever 42 to push against abutment 142 of latch actuator 106, shifting lever 42 and actuator 106 from the position shown in FIG. 8 to the latch release position shown in FIG. 9. With the door latches released, the door is free to move from its closed position, and with the rearwardly moving slider 72 maintaining tension on wire 88, the bight of wire 88 which is trained around pulley 104 (FIG. 7) pulls the door along with the slider because the opposite end of the wire is effectively anchored to the door via lever 42 and its engagement with latch actuator 106.

During powered opening of the door, the bias exerted by the spring 110 on the latch actuator 106 may exceed the force necessary to move the door. In this event, the latch actuator 106 may shift from the latch open position shown in FIG. 9 partially or fully toward its FIG. 9 position until the force biasing the latches toward their closed position counterbalances or exceeds the tension in wire 88 necessary to keep the door moving.

In the case of powered closing of the door, the slider 72 is pulled to the right as viewed in FIG. 7 by push-/pull cable 34 and, as explained above, the engagement between the forward edge of the web 76 of the slider and the web portion 94 of housing 92 drives the door forwardly. The abutment 90 of wire 88 (FIG. 7) is maintained in abutment with the rearward end of enlargement 78 of slider 72 because the length of wire 88 and the tension applied by spring 144 to lever 42 establishes this arrangement.

Figure 10:
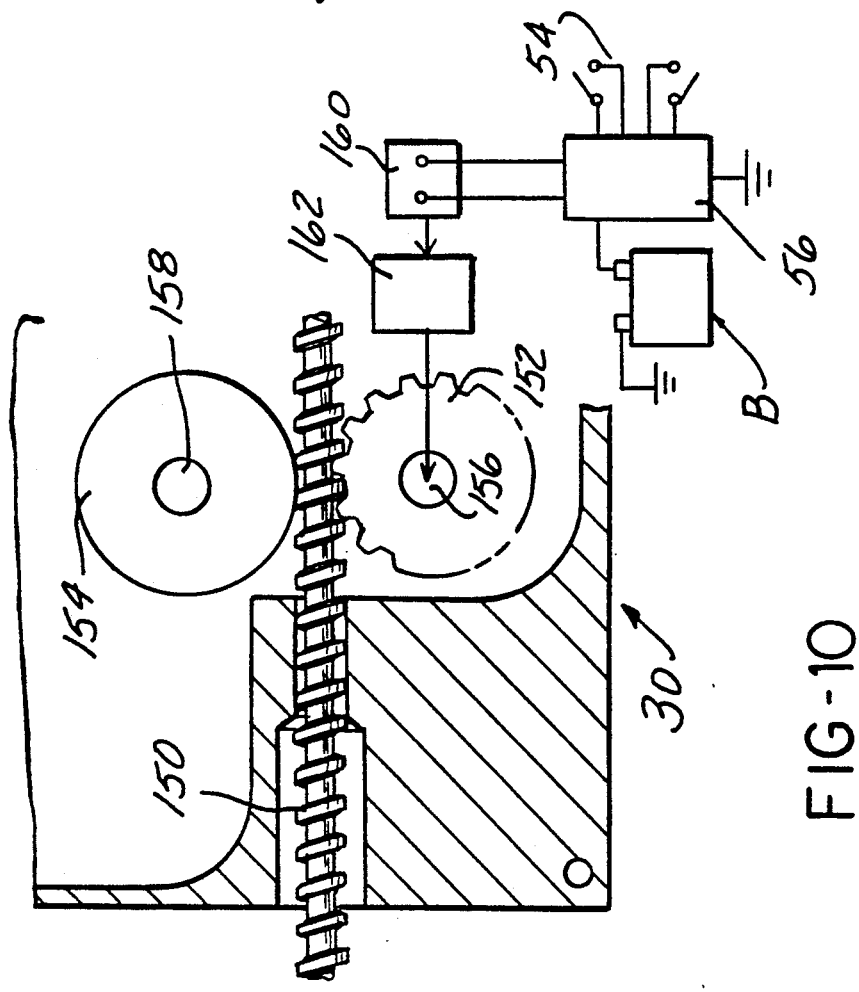
FIG. 10 is a schematic diagram showing a portion of the power drive components of the mechanism.

A schematic representation of the gear box and drive 30 employed to drive push/pull cable 34 in movement is shown in FIG. 10. Push/pull cable 34 is constructed with a wire 150 helically wound upon the exterior of the cable in uniformly spaced winding. Cable 34 projects entirely through gear box 30 and within the gear box passes through the nip between a gear 152 and an idler 154, gear 152 having teeth adapted to mesh between adjacent turns of the wire winding 150 of cable 34. Gear 152 and idler 154 are mounted for rotation upon shafts 156, 158 mounted in gear box 30.

Idler 154 is mounted for free rotation. Gear 152 will be referred to as a drive gear and is coupled to a reversible electric drive motor 160 via a normally disengaged clutch 162 When clutch 162 is in its normal disengaged position, gear 152 is uncoupled from motor 160 and can rotate freely. Clutch 162 may take the form of a centrifugal clutch which is automatically engaged when motor 160 is energized and driven in rotation, and which is disengaged when motor 160 is stationary. The normally disengaged clutch 162 permits cable 34 to move freely through the gear box when the sliding door is manually operated. The meshing engagement between the teeth of gear 152 and wire 150 on cable 34 provides a positive drive connection between the gear and cable, and hence drive gear 152 must be capable of rotating freely to accommodate movement of cable 34 during manual operation of the door. Idler gear 154 functions primarily to maintain the wire 150 of cable 34 in mesh with the teeth of gear 154 without applying friction to the cable.

While motor 160 might well be operated directly by the door open — door close switches 54 in the same fashion as powered door windows are operated, preferably the power supply to motor 160 from the car battery B and switches 54 are connected to motor 160 via an electronic control unit 56. This unit can be suitably programmed to deenergize the motor upon the sensing of an overload as might be occasioned by the trapping of an object between the closing door and door frame, provide for express opening or closing of the door, etc.

Figure 11:
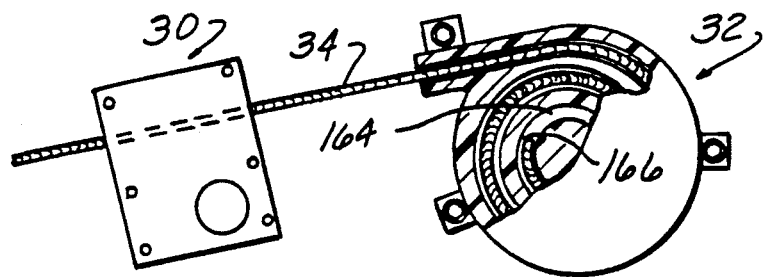
FIG. 11 is a top plan view, partially in section, showing details of the push/pull cable storage housing.

When the door is closed, that portion of cable 34 which projects from the side of gear box 30 remote from the slider must be of a length at least equal to the length of the path of movement of the door. In that total length of travel of the door may be 3 feet or more, the free end of the cable 34 is led, as best seen in FIG. 11, from gear box 30 into a cable storage housing 32 having an inwardly spiralling passage 164 of a diameter large enough to freely slidably receive the cable. The cable is free to move into and out of this passage as required — the free end 166 of the cable is located within housing 32 at all times. The housing preferably is fixedly mounted on the vehicle floor beneath the passenger seat.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a sliding door mounted in a door frame for sliding movement along a fixed path between a closed position wherein said door is positioned within a door opening in said frame and an open position wherein said door is withdrawn clear of said opening, releasable latch means on said door for latching said door to said frame when said door is in said closed position, and power means operable to drive said door between said open and said closed positions;

the improvement wherein said power means comprises elongate guide track means fixedly mounted on said frame and defining a slide path extending in adjacent parallel relationship to said fixed path, a slider slidably received in said track means for guided sliding movement along said slide path between a first end limit and a second end limit, an elongate flexible push/pull cable slidably received in said guide track means and fixedly secured at one end of said slider, said cable having a length in excess of the length of said slide path between said first and second end limits of movement of said slider and said cable extending from said slider to project outwardly from one end of said track means, reversible power drive means mounted on said frame adjacent said one end of said track means and coupled to said cable for driving said cable and slider along said track means to drive said slider between said first and second end limits, a door abutment fixedly mounted on said door and projecting into the path of movement of said slider between said slider and said one end of said track means to transmit movement of said slider toward said one end of said track means to said door, and one way motion transmitting means coupled between said slider and said door for transmitting motion of said slider toward the opposite end of said track means to said door, said slider being located at said first end limit when said door is in said closed position and being located at said second end limit when said door is in said open position.

2. The invention defined in claim 1 wherein said one way motion transmitting means comprises a latch means release member shiftable to release said latch means and coupled at one end to said latch means, means coupling the other end of said latch release member to said slider, said slider being operable upon movement of said slider away from said first end limit to shift said release member relative to said door to release said latch means and to couple said door to said slider via said latch means for movement with said slider from said closed to said open position.

3. The invention defined in claim 2 wherein said latch means release member comprises an elongate flexible wire slidably received within and projecting from the opposite ends of an elongate flexible sheath fixedly secured at its respective opposite ends respectively to said door adjacent said latch means and adjacent to said door abutment.

4. The invention defined in claim 1 wherein said power drive means comprises a selectively energizable reversible electric motor, rotary gear drive means operatively meshed with said cable to transform rotation of said gear means into longitudinal movement of said cable and vice versa, and normally disengaged clutch means engageable to drivingly couple said motor to said gear means in response to energization of said motor and operable when disengaged to accommodate free rotation of said gear means relative to said motor.

5. The invention defined in claim 4 wherein said cable comprises a main cable and a wire like member helically wound around said main cable, said gear means drive means comprising a rotary drive gear and a rotary idler mounted for rotation about parallel axes and engaged with said wire like member at opposite sides of said cable with said cable passing tangentially between said idler and said drive gear, and said clutch means is operable when engaged to couple said drive gear to said motor and operable when disengaged to accommodate free rotation of both of said idler and said drive gear.

6. In a sliding door assembly for opening and closing a door opening in the side of a vehicle body, said assembly including a door mounted on said body for forward and rearward movement along a fixed path between a closed position wherein said door is sealingly seated within said door opening and an open position wherein said door is disposed at the outer side of said body with its forward edge located adjacent the rearward edge of said opening, releasable latch means on said door for releasably latching said door in said closed position, and power means operable to drive said door between said open and said closed position;

the improvement wherein said power means comprises elongate guide track means having a guide passage extending longitudinally therethrough fixedly mounted on said body with said passage extending parallel to said fixed path from a forward end located adjacent the forward edge of said door opening to a rearward end located adjacent the rearward edge of said door opening, a slider slidably received in said passage and having a drive portion projecting outwardly through a longitudinal slot in said track means coextensive with said passage, an elongate flexible push/pull cable slidably projecting rearwardly into the forward end of said passage and fixedly secured at its rearward end to said slider, reversible power drive means mounted in said body adjacent the forward end of said track means selectively actuable to drive said cable and said slider in forward or rearward movement along said passage between a forward and a rearward end limit of movement, first means on said door projecting into the path of movement of said drive portion of said slider for driving engagement by the forward side of said drive portion of said slider to transmit forward movement of said slider to said door, and second means on said door projecting into the path of movement of said drive portion for driving engagement with the rearward side of said drive portion of said slider to transmit rearward movement of said slider to said door.

7. The invention defined in claim 6 wherein said releasable latch means includes a manually operable release member for shifting said latch means to a latch release position, said second means being operable to shift said release member to release said latch means in response to rearward movement of said drive portion of said slider relative to said door.

8. The invention defined in claim 7 wherein said second means comprises a release member actuating means on said door, a wire like member coupled in tension between said release member actuating means and said drive portion of said slider.

9. The invention defined in claim 6 wherein said door includes a door support bracket fixed to said door and projecting from said door adjacent the lower front corner of said door inwardly toward the longitudinal centerline of said vehicle body, said bracket having roller means thereon operatively received in a roller track fixedly mounted in said vehicle body and extending generally along the lower edge of said door opening to support and guide said door in movement along said fixed path;

said first means on said door comprising a web like generally horizontally extending rearward edge extending laterally across the path of movement of said drive portion of said slider.

10. The invention defined in claim 9 wherein said second means comprises an elongate Bowden wire having a flexible outer sheath and a wire slidably received within said sheath and projecting from both opposite ends of said sheath, means fixedly mounting one end of said sheath on said bracket, that portion of said wire projecting from said one end of said sheath extending from said sheath and being coupled to said drive portion of said slider, and means coupling the opposite end of said wire to latch release means mounted on said door.

11. The invention defined in claim 10 wherein said releasable latch means includes a latch actuating member mounted on said door for movement between a latch engaged position and a latch release position, means fixing the other end of said sheath of said Bowden wire to said door at a location spaced from said actuating member, and said latch release means comprises first actuating means coupled to said opposite end of said wire for shifting said latch actuating member from its latch engaged position to its latch release position in response to tensioning of said wire by rearward movement of said slider relative to said door.

12. The invention defined in claim 11 wherein said first actuating means comprises a lever pivotally mounted on said door and coupled to said wire, abutment means on said lever engageable with said latch actuating member and operable upon pivotal movement of said lever induced by tensioning of said wire to move said actuating member toward said latch release position.

13. The invention defined in claim 6 wherein said reversible power drive means comprises a drive housing mounted on said body adjacent the forward end of said guide track means, said cable extending forwardly from said forward end of said guide track through said drive housing into a cable storage housing mounted on said body at the side of said housing remote from said guide track means, and reversible drive means in said drive housing selectively operable to drive said cable longitudinally through said housing to pass cable from said storage housing into said guide track means upon rearward movement of said cable and to pass cable from said guide track means into said storage housing upon forward movement of said cable.

14. The invention defined in claim 13 wherein said reversible drive means includes a reversible rotary drive motor, helical thread like means on said cable, a pinion gear rotatably mounted in said drive housing in meshed engagement with said thread like means on said cable, normally disengaged clutch means in said drive housing operable when engaged to drivingly couple said motor to said drive pinion and operable when disengaged to permit said drive pinion to rotate freely in said drive housing.

* * * * *